(Model.)
W. LEWIS.
FRICTION CATCH.
No. 427,000. Patented Apr. 29, 1890.
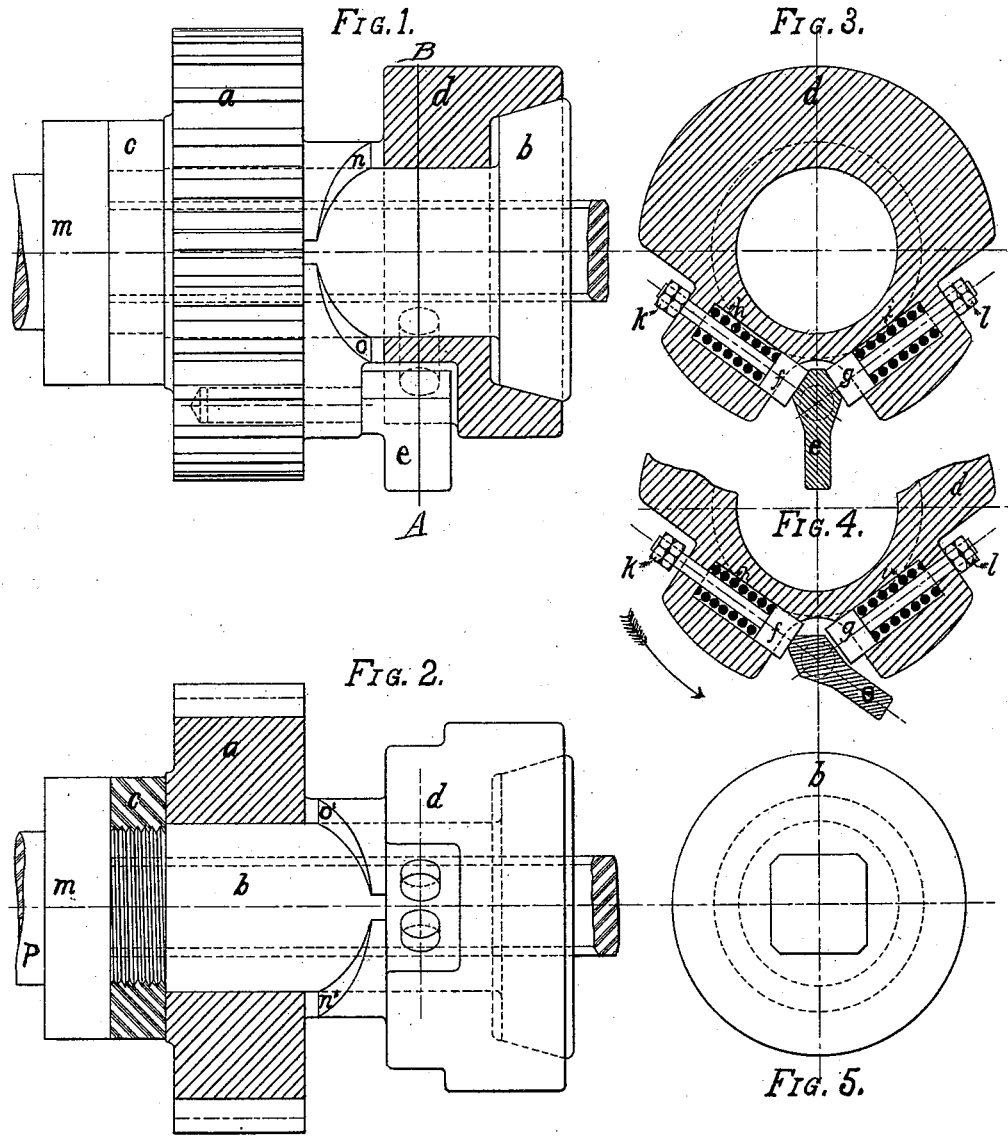
WITNESSES:
John L. Phillips
E. R. Harper
INVENTOR
Wilfred Lewis

UNITED STATES PATENT OFFICE.

WILFRED LEWIS, OF PHILADELPHIA, PENNSYLVANIA, ASSIGNOR TO WILLIAM SELLERS & COMPANY, INCORPORATED, OF SAME PLACE.

FRICTION-CATCH.

SPECIFICATION forming part of Letters Patent No. 427,000, dated April 29, 1890.

Application filed August 9, 1889. Serial No. 320,273. (Model.)

*To all whom it may concern:*

Be it known that I, WILFRED LEWIS, of the city and county of Philadelphia, and State of Pennsylvania, have invented a new and useful Improvement in Friction-Catches, of which the following is a specification.

My invention relates to that class of machinery in which one part of a mechanism is driven intermittently in a given direction by another part having a reciprocating motion, and for which purpose a ratchet is commonly employed. In such devices the driving and driven members are automatically connected by an engaging-pawl when motion takes place in one direction and disconnected when the motion of the driving member is reversed. The engaging-pawl may be thrown into action by gravity or a spring, and it is frequently so devised as to operate in either direction or remain inoperative at pleasure, according to the position in which it is set. There is no novelty, therefore, in a reversible ratchet; but the toothed ratchet has certain limitations and defects which render it unsuitable in many cases where ratchets are used. The amount of movement for the driven member is limited by the number of teeth in the ratchet-wheel; but the smaller the teeth the weaker they become, so that it is practically impossible to obtain a very small movement except at the sacrifice of strength and durability. Furthermore, the engaging-pawl may not take a full bearing when in action, and the corners may in consequence become broken or rounded, ultimately causing failure in the action of the ratchet. Another inconvenience in the use of this form of ratchet arises from the difficulty of disengaging or reversing while in the act of driving.

It is an object of my invention to obtain a reversible catch-feed of unlimited fineness from said reciprocating movement.

It is a further object of my invention to set the catch at any time during a stroke to cease feeding at the end of that stroke or to feed in the opposite direction on the return-stroke; and to these ends my invention consists in the combination of right and left helical cam-faces on the engaging member of the catch and corresponding faces on its mate.

It further consists in the combination of a controlling-switch with elastic stops between the engaging member of the catch and its cam-faced mate, whereby either right or left hand cam-faces may be brought into or thrown out of action.

Figure 1 is a plan of my reversible friction-catch, with one-half of the engaging member removed to show more clearly the right and left hand helical cam-faces of its driver. Fig. 2 is an elevation of Fig. 1, with one-half of the driver and its abutment collar removed. Fig. 3 is a section on the line A B, Fig. 1, showing the elastic connection between the engaging-member and its driver set to make the catch inoperative. Fig. 4 is a partial section on the same line, showing the elastic connection set to feed in the direction indicated by the arrow. Fig. 5 is an end view of the coned sleeve or driven member shown in Figs. 1 and 2.

$a$ is the cam-faced driver having a reciprocating motion upon its axis.

$b$ is the driven member having a coned surface at one end and the abutment collar C at the other.

$d$ is the engaging member between $a$ and $b$, having right and left hand cam-faces $o'$ and $n'$, fitting against corresponding surfaces in $a$, and a coned friction-surface fitting against $b$.

$e$ is the switch turning in $a$ and forming an abutment against which the plungers $f$ and $g$ in $d$ may act.

$h$ and $i$ are springs in $d$ actuating the plungers $f$ and $g$, respectively.

$k$ and $l$ are stops on $f$ and $g$, respectively, by which their movement under spring action is limited.

$m$ is a collar on the rod $p$, to which the device is required to impart motion.

The driving member $a$ and the engaging member $d$ fit loosely on the sleeve of the driven member $b$, and when the right and left hand cam-faces of $a$ and $d$ are in contact there is a slight amount of clearance for these pieces between the collar C and the cone face of $b$. Now, if the driving member $a$ be rotated in either direction relative to the engaging member $b$, it is evident that this clearance will be taken up, and if the motion of the driving member be continued, the driven member $b$ will be forced to turn with $a$ and $d$. This is a necessary consequence, because the parts must be so proportioned that the moment of friction between the conical faces of $d$ and $b$ is greater than the driving moment between the helical faces of $a$ and $d$. If, therefore, the engaging member is free to engage with either of the cam-faces $o$ or $n$ on the driving member $a$, the driven member $b$ will follow the reciprocating motion of the driver. On the other hand, if the engaging member is held in a central position relative to the driving member, no movement of the driven member can result, and this relation is established by means of the switch $e$, when set as shown in Fig. 3. The plungers $f$ and $g$ there act as stops to prevent the cam-faces on $a$ and $b$ from engaging with each other.

When the switch is set as shown in Fig. 4, the plunger $f$ is forced back by the end of the switch $e$, compressing the spring $h$ and forcing the left-hand cam-faces $n$ $n'$ on $a$ and $d$ together. At the same time the switch is disconnected with the plunger $g$, and the force of its spring $i$ is expended on the stop $l$. The left-hand cam-faces $n$ $n'$, being thus brought together by the action of the spring $h$, it is evident that when the driving member moves in the direction indicated by the arrow, Fig. 4, the engaging member $d$ and the driven member $b$ will move with it. When the motion of the driving member is reversed, however, the engaging member is driven only by the spring $h$, and the pressure exerted therefrom on the conical surfaces of $d$ and $b$, being insufficient to drive the latter, the engaging member simply slips around without effect, as desired. It is evidently possible to turn the switch $e$ at any time, whether the catch is working or not, as the work of moving it is only that required to compress the spring $h$ or $i$. When the switch $e$ is turned in the opposite direction from that shown in Fig. 4, compressing the spring $i$, the right-hand cam-faces $o$ $o'$ will be brought in contact, and the catch will feed in the opposite direction.

It is evident that the essential features of my reversible friction-catch are not limited to the form as shown, and it will readily be seen that the functions of the parts designated as "driving" and "driven" members can be reversed. For example, if the feed-rod $m$ be driven back and forth, $a$ may be fed in either direction. The controlling-switch $e$ might be pivoted in $d$ and the plunger-springs be located in $a$ without affecting the essential features of my invention; nor is it necessary for an elastic connection between $a$ and $d$ to be made in precisely the manner shown. A great variety of such arrangements might be represented, the essential features of which are a controlling-switch on one of the members acting against a spring abutment on the other to start or stop the motion of the rod $m$ in either direction. It will also be observed that the driven member $b$ may be a part of the feed-rod $m$ when there is no occasion to remove the catch from the rod. As already pointed out, the successful operation of the catch depends upon the moment of friction between $b$ and $d$ being greater than the driving moment between $a$ and $d$, and as the coefficients of friction vary with the lubrication and condition of surface, it may sometimes happen that the friction on cam-faces becomes so great by the adhesion of gritty material as to seriously interfere with good results. This surface is therefore generally protected by a covering, which is here omitted for the sake of clearness.

Having now described my invention, what I claim as new, and desire to secure by Letters Patent, is—

1. In a friction-catch, a driving member and a driven member, in combination with an engaging member provided with right and left hand helical faces, substantially as shown and described.

2. In a friction-catch, the combination, with a driving member, a driven member, and an engaging member provided with right and left hand helical faces, of a controlling-switch, substantially as shown and described.

WILFRED LEWIS.

Witnesses:
JOHN L. PHILLIPS,
E. R. HARPER.